(12) United States Patent
Väänänen et al.

(10) Patent No.: US 6,401,908 B1
(45) Date of Patent: *Jun. 11, 2002

(54) APPARATUS FOR PROCESSING LUMPY MATERIAL

(75) Inventors: Eero Väänänen; Martti Jankkila, both of Tornio (FI)

(73) Assignee: Outokumpu Oyj, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/331,278

(22) PCT Filed: Dec. 22, 1997

(86) PCT No.: PCT/FI97/00829

§ 371 (c)(1),
(2), (4) Date: May 1, 2000

(87) PCT Pub. No.: WO98/29323

PCT Pub. Date: Jul. 9, 1998

(30) Foreign Application Priority Data

Dec. 30, 1996 (FI) .................................................. 965254

(51) Int. Cl.⁷ ........................ B65G 47/26; B65G 21/10; B65G 37/00; B65G 25/00
(52) U.S. Cl. ..................... 198/459.1; 198/429; 198/586; 198/588
(58) Field of Search ................................. 198/586, 431, 198/459.1, 429, 588, 594, 812

(56) References Cited

U.S. PATENT DOCUMENTS

| | | | |
|---|---|---|---|
| 2,496,548 A | 2/1950 | La Rosa et al. | |
| 3,435,967 A | * 4/1969 | Sackett, Sr. | |
| 3,530,973 A | * 9/1970 | Rossi | |
| 3,590,177 A | * 6/1971 | Ustin | |
| 3,959,614 A | * 5/1976 | Graninger | 200/47 |
| 3,972,411 A | * 8/1976 | Yatsunami et al. | 198/524 X |
| 4,345,655 A | 8/1982 | Fahrenholz | 171/63 |
| 4,395,176 A | * 7/1983 | Green | 198/588 X |
| 5,476,361 A | 12/1995 | Uno | 414/790.3 |
| 5,787,941 A | * 8/1998 | Nakagawa | 198/597 X |
| 5,887,700 A | 3/1999 | Priuli | 198/418.6 |
| 6,115,644 A | 9/2000 | Petty et al. | 700/117 |

FOREIGN PATENT DOCUMENTS

| | | |
|---|---|---|
| DE | 3338068 | 6/1984 |
| FR | 2616421 | 6/1987 |

* cited by examiner

Primary Examiner—Christopher P. Ellis
Assistant Examiner—Gene O. Crawford
(74) Attorney, Agent, or Firm—Morgan & Finnegan, L.L.P.

(57) ABSTRACT

The invention relates to an apparatus for processing lumpy, essentially spherical material such as pellets, so that the lumpy material can be applied on a surface that is set in an essentially continuous motion, as an advantageous layer for the further processing of said material, said apparatus comprising means (1) for conveying the material and for feeding the material onto a surface (15) that is set in an essentially continuous motion. According to the invention, the conveyor (1) is installed movably in an alternating motion between two positions (3, 4) in order to feed the material conveyed by the conveyor (1) as a layer (16) that is advantageous both in thickness and in cross-section onto a surface (15) set in an essentially continuous motion.

8 Claims, 1 Drawing Sheet

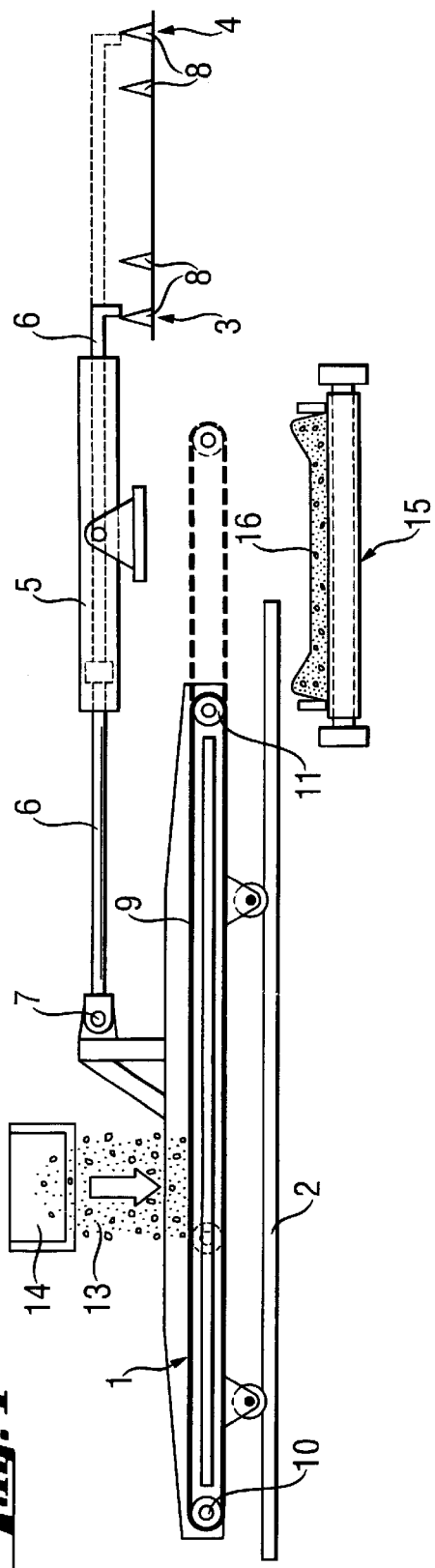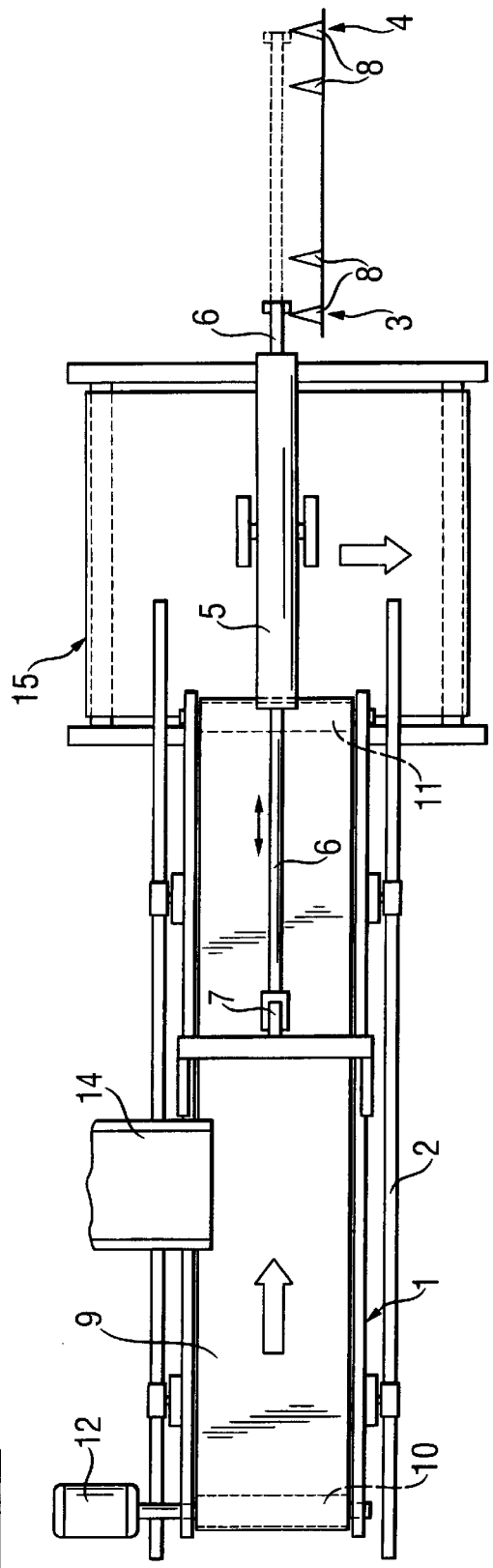

APPARATUS FOR PROCESSING LUMPY MATERIAL

The present invention relates to an apparatus for processing lumpy and advantageously spherical material, such as pellets, so that the lumpy material can be applied on an essentially continuously moving surface to form a layer which is advantageous both in thickness and in cross-section, so that in the further processing of the lumpy material, the gas to be conducted through said layer can be made to penetrate the layer in an essentially homogeneous fashion.

Several smelting processes require that the material to be fed into smelting is not too finely divided. Therefore a finely ground material such as concentrate must first be pelletized and thereafter sintered in order to improve the strength of the pellets. The sintering can be carried out for instance in a conveyor-type furnace where hot gas is blown in the pellet bed in order to sinter the wet pellets. For obtaining a homogeneous sintering product, the hot gas must be allowed to flow through the pellet bed in an essentially even fashion. For creating an even gas flow, also the pellet bed must be essentially even in thickness, so that the whole pellet bed is treated in a way that is advantageous for the sintering product.

In the processing of lumpy, essentially spherical material, it is important to take into account the special feature of the material, i.e. its round surface, which makes the material move piece by piece. When this type of lumpy material should be applied as an essentially even layer, it easily happens that without special procedures the layer becomes very thick in the middle and becomes thinner towards the edges. In thickness, such a layer does not satisfy the requirements of an essentially even layer.

Lumpy and essentially spherical material can be processed, in order to obtain a layer that is essentially even in thickness, for example by conveying the material on a conveyor which is articulated at one end, so that the free end of the conveyor moves along a spherical orbit, according to the width of a second conveyor located underneath the first conveyor. This kind of combination requires a lot of space in the lengthwise direction, because the conveyors are arranged in succession. In order to obtain an even layer, the material can also be conveyed by moving back and forth a chain-operated conveyor provided with a crank lever mechanism, so that the material is fed in this conveyor at one end, and it drops further onto a transversal conveyor located underneath this first conveyor. The drawback of a chain-operated conveyor is that the thickness of the material layer created on the lower conveyor can only be adjusted by changing the chain wheels. This in turn requires that the chain lengths are altered, and further that the conveyor transfer rate and stroke are adjusted.

The object of the present invention is to eliminate some of the drawbacks of the prior art and to achieve an improved apparatus for processing lumpy and essentially spherical material, wherein the lumpy material is applied on an essentially continuously moving surface in a layer that is advantageous both in thickness and in cross-section, so that the gases to be conducted through said layer in the further processing of the lumpy material are made to penetrate the layer in an essentially even fashion. The essential novel features of the invention are apparent from the appended claims.

According to the invention, the apparatus for processing lumpy material is provided with an essentially continuously operated belt conveyor, which moves back and forth between two positions in relation to a second conveyor located underneath the first conveyor. The opposite positions of the alternating motion are chosen so that the material discharged from the belt conveyor drops onto the conveyor surface of the second conveyor placed underneath the belt conveyor essentially along the whole width of the conveyor surface. The alternating motion of the belt conveyor is created by a specific moving member connected to the conveyor, advantageously a hydraulic cylinder provided with a double piston. Other corresponding members that are operated for instance electrically can likewise be employed as the moving members.

According to the invention, the speed of the moving member of the belt conveyor can be steplessly adjusted. Moreover, on the trajectory of the moving member, advantageously near to both ends of the trajectory, there are provided, movably in the lengthwise direction of the trajectory, at least two limit switches whereby the speed of the alternating motion of the belt conveyor can be adjusted near the end of the trajectory of the belt conveyor. When approaching the end of the trajectory, the motion of the belt conveyor is advantageously slowed down by means of the limit switch located first in the proceeding direction. Now the second limit switch in the proceeding direction is placed at the end of the trajectory, and by means of said second limit switch the motion of the belt conveyor is respectively made to speed up, when the belt conveyor starts moving from the end of the trajectory back towards the first limit switch. By means of the location of the first limit switch of the trajectory, it is also possible to adjust the required delay times of the motion of the belt conveyor at both ends of the trajectory. Moreover, by adjusting the speed of motion of the belt conveyor, the quantity of material fed on the second conveyor located underneath the belt conveyor can also be adjusted in the transversal direction of the conveyor belt.

In the apparatus according to the invention, the belt of the belt conveyor is made to rotate so that the belt speed in relation to the quantity of the lumpy material fed thereon is essentially constant irrespective of the position and motional direction of the belt conveyor. The motion of the belt in the belt conveyor is achieved by means of an electric motor or a hydraulic motor. The belt speed of the belt conveyor is advantageously adjusted according to the motional speed, so that the belt conveyor feeds lumpy material onto the second conveyor placed below only when the belt conveyor is returning from that position on the belt conveyor trajectory that is located farthest with respect to the moving member of the belt conveyor. When the belt conveyor is moving from the position on the belt conveyor trajectory that is located nearest with respect to the moving member of the belt conveyor towards the position that is located farthest therefrom, the belt speed of the belt conveyor is advantageously the same as the motional speed of the belt conveyor, in which case the belt speed of the belt conveyor with respect to the belt conveyor proper is zero. When the belt conveyor now moves back from the position on the trajectory that is located farthest in relation to the moving member of the belt conveyor, the speed of the belt conveyor belt is doubled. As a result, on the belt conveyor there always is provided an essentially even layer of lumpy material, which essentially helps in the further processing of the lumpy material.

The invention is explained in more detail below, with reference to the appended drawing, where FIG. 1 shows a preferred embodiment of the invention in partial cross-section, and FIG. 2 is a top-view illustration of the embodiment of FIG. 1.

According to FIGS. 1 and 2, the belt conveyor 1 is installed movably in the supporting structure 2, so that the belt conveyor 1 moves between the positions 3 and 4 in an essentially continuous operation. The locations of the positions 3 and 4 are determined so that the belt conveyor 1 is movable, with respect to the second conveyor 15 arranged underneath the first belt conveyor 1, essentially along the whole width of the conveyor surface of the conveyor 15. In order to move the belt conveyor 1, in the supporting frame 2 there is installed a hydraulic cylinder 5, and the piston rod 6 of said cylinder 5 is connected to the frame of the belt conveyor 1 by means of a connecting member 7. In order to slow down and respectively speed up the motion of the belt conveyor 1, in the vicinity of the positions 3 and 4, in the trajectory of the belt conveyor 1, essentially near to the positions 3 and 4, there are provided limit switches 8. Moreover, the belt conveyor 1 includes a conveyor belt 9, which is made to move between the driving drum 10 and the bending drum 11 by means of a rotation motor 12 connected to the driving drum 10.

When the belt conveyor 1 is in operation, onto the belt conveyor 1 there is fed lumpy material 13 to be conveyed from the conveyor 14. The conveyor belt 9 of the belt conveyor is made to rotate by means of the rotation motor 12. At the same time, the belt conveyor 1 is made to move between the positions 3 and 4, so that when moving from the position 3 located nearest to the belt conveyor moving member 5 towards the position 4 that is located farthest, the speed of the belt conveyor belt 9 is advantageously the same as the motional speed of the belt conveyor 1, so that the belt speed of the belt conveyor 9 with respect to the belt conveyor 1 proper is zero. When the belt conveyor 1 reaches the first limit switch 8 in relation to the proceeding direction, and when it further proceeds towards the position 4, the speed of the belt conveyor 1 begins to slow down, and material 13 begins to drop onto the conveyor 15 provided underneath the belt conveyor 1. When the belt conveyor 1 reaches the position 4, the motional direction of the belt conveyor 1 changes, and its speed begins to rise owing to the influence of the second limit switch 8, until the belt conveyor 1 reaches the first limit switch 8. After passing the first limit switch 8, the speed of the belt conveyor 1 is set to be essentially constant, until the belt conveyor 1 reaches the first limit switch 8 located near the position 3.

When the belt conveyor 1 is returning from the position 4 that is located farthest from the belt conveyor moving member 5, the belt speed of the belt conveyor 9 between the first limit switches 8 is doubled in relation to the speed of the belt conveyor 1, and the material 13 to be conveyed is dropped onto the conveyor 15. When the speed of the belt conveyor 1 is constant, the material dropped on the conveyor 15 forms a material bed 16 that is advantageous for further processing both in thickness and in cross-section. At the edges of the conveyor 15, between the limit switches 8 and the positions 3 and 4, there is dropped more material 13 than in the area between the limit switches 8. As the material moves further, this additional material helps to shape the material bed, so that at the edges it obtains a cross-section which advantageously conforms to a regular trapezoidal shape, because part of the excessive material 13 that is located at the edge rolls, along with the motion of the material, towards the edge of the conveyor surface and possibly drops out thereof.

What is claimed is:

1. An apparatus for processing lumpy material, so that the lumpy material can be applied on a surface that is set in an essentially continuous motion, to form a layer for the further processing of said material wherein the thickness and cross-section of said layer can be controlled, said apparatus comprising:

a belt conveyor having a controllably movable belt, said belt moving continuously and in a single direction in relation to said belt conveyor, said belt having a first upper surface for supporting and moving the material and for feeding the material onto a second upper surface that is set in an essentially continuous motion, wherein the belt conveyor is movably disposed in a supporting structure, capable of movement in an alternating motion in a lengthwise direction of the belt conveyor between first and second positions wherein movement is accomplished by a moving member, wherein the belt conveyor is located nearest to the moving member in said first position and said belt conveyor is located farthest from said moving member in said second position, and the movement of the moving member is controlled such that the speed of said belt is substantially equal to the speed at which said belt conveyor oscillates when said belt conveyor is moving from said second position to said first position, and the motion of said belt conveyor is limited by contacting a limit switch in each of said first and second positions, wherein the thickness and cross-section of said layer deposited or said second upper surface can be controlled by adjusting the motion of said upper surface of said belt in relation to said second upper surface.

2. The apparatus according to claim 1, wherein the distance between said first and second positions of the conveyor is substantially equal to the length of the surface onto which the layer is deposited.

3. The apparatus according to claim 1 or wherein said moving member is a hydraulic cylinder.

4. The apparatus according to claim 1 or wherein said moving member is electrically operated.

5. The apparatus according to claim 1, wherein the thickness of said layer is substantially uniform.

6. The apparatus according to claim 1, wherein said lumpy material is substantially comprised of pellets.

7. The apparatus according to claim 6, wherein said pellets are substantially spherical.

8. An Apparatus for processing lumpy material, said apparatus comprising:

first and second conveyor belts capable of continuously moving lumpy material, said first and second conveyor belts having respective first and second upper surfaces for supporting said lumpy material as said first and second conveyor belts are moving, said first and second conveyor belts positioned substantially transversely with respect to one another so that lumpy material being moved on said first upper surface of said first conveyor belt is capable of being deposited onto said second upper surface of said second conveyor belt, a belt conveyor onto which said first conveyor belt is mounted, said belt conveyor being capable of an oscillating movement in the direction in which said first conveyor belt is moving, wherein the motion of said first conveyor belt with respect to said second conveyor belt is essentially constant;

a moving member that is capable of moving said belt conveyor between first and second positions resulting in said oscillating movement of said belt conveyor;

first and second switches for limiting the movement of said moving member and thereby controlling the oscillating movement of said belt conveyor, whereby said oscillating movement of said belt conveyor can be controlled by said moving member and said first and second switches so that lumpy material being moved on said first upper surface of said first conveyor belt is capable of being deposited onto said second upper surface of said second conveyor belt in a layer of predetermined thickness and cross-section.

* * * * *